United States Patent [19]

Shiba

[11] 3,805,612
[45] Apr. 23, 1974

[54] ORIFICE FLOW METER
[75] Inventor: Kamekichi Shiba, Tokyo, Japan
[73] Assignee: Oval Engineering Co., Ltd., Tokyo, Japan
[22] Filed: Dec. 29, 1972
[21] Appl. No.: 319,420

Related U.S. Application Data
[63] Continuation-in-part of Ser. No. 113,383, Feb. 8, 1971, abandoned.

[52] U.S. Cl. ............................. 73/211, 138/44
[51] Int. Cl. ............................................ G01f 1/00
[58] Field of Search ................ 73/211; 138/40, 44

[56] References Cited
UNITED STATES PATENTS
1,480,661   1/1924   Brown.................................. 73/211
2,614,423  10/1952   Carbone ............................... 73/211
2,627,876   2/1953   Goddard........................... 138/45 X Primary Examiner—Richard C. Queisser
Assistant Examiner—Arthur E. Korkosz
Attorney, Agent, or Firm—George Vande Sande

[57]     ABSTRACT

An orifice flow meter provided with an orifice plate which has a radially extending fluid pressure measuring channel formed therethrough, with one end opening to the throat of the orifice plate. The orifice in the plate has a rounded edge whose radius preferably falls within the ratio of 0.10 to 0.40 of the thickness of the orifice plate.

2 Claims, 5 Drawing Figures

ORIFICE FLOW METER

CROSS-REFERENCE TO THE RELATED APPLICATION

This application is a Continuation-in-Part of U.S. Ser. No. 113,383 filed on Feb. 8, 1971 now abandoned.

BACKGROUND OF THE INVENTION

This invention relates to an improved orifice flow meter.

An orifice flow meter is a venturi-type flow meter using an orifice as throttling means, and is most widely being used as an industrial flow meter.

Conventional orifice flow meters are so designed that the flow rate of fluid is measured in terms of the pressure differential between the fluid pressures at taps which are provided upstream and downstream of an orifice respectively. The tap on the upstream side is provided at a location where the fluid flow is not detached from the conduit wall, and the tap on the downstream side is broken away at the position of vena contracta. Thus, the relation between the pressure differential and the flow rate is obtained according to the Bernoulli's theorem, using the larger cross-sectional area of the conduit as the cross-sectional area of the conduit and the cross-sectional area of the conduit at the position of vena contracta as a smaller cross-sectional area, and the flow rate of fluid is measured based on said relation.

The most important problem for the conventional orifice flow meters is that the coefficient of vena contracta, that is, the ratio between the cross-sectional area of the conduit at the position of vena contracta and the area of the orifice opening is largely influenced by the shape of the orifice. For this reason, an orifice flow meter used for practical applications is desired to have a constant coefficient of vena contracta and considerably severe restrictions are imposed on the shape and other factors of the orifice.

SUMMARY OF THE INVENTION

In the orifice flow meter of the instant invention, since the area of the orifice opening is employed per se as the smaller cross-sectional area of the conduit, instead of the cross-sectional area of the conduit at the position of vena contracta, unlike the conventional orifice flow meters, the vena contracta phenomenon gives no effect on the measurement of flow rate.

The object of the present invention is to provide an orifice flow meter provided with an orifice plate which has a radially extending fluid pressure measuring channel formed therethrough, with one end opening into the throat of the orifice plate.

The orifice flow meter of the invention is characterized by the fact that it uses an orifice which is provided with a tap.

BRIEF DESCRIPTION OF THE DRAWINGS

The present invention will be described in detail hereunder with reference to the accompanying drawings, in which.

DETAILED DESCRIPTION OF THE PREFERRED EMBODIMENT

Figure 1A:
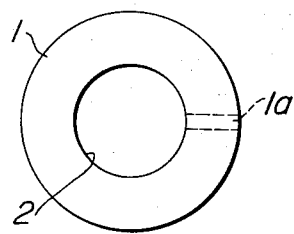
FIGS. 1a – 1d are schematic illustrations respectively showing various types of the orifice with tap, used in the present invention.
Figure 1B:
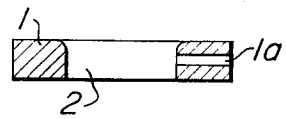
Figure 1C:
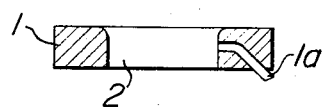
Figure 1D:
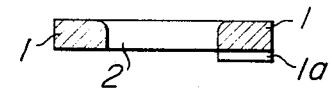

The orifice used in the present invention has a tap provided in the peripheral wall of the throat thereof, as exemplified in FIGS. 1a – 1c. Referring to FIG. 1a, reference numeral 1a designates a fine cylindrical tap formed through the wall of the orifice 1, and 2 designates the throat of the orifice. FIG. 1b is a vertical cross-sectional view of the orifice shown in FIG. 1a, through the axis of the tap. In the embodiment of FIGS. 1a and 1b, the tap is a single fine cylindrical channel radially extending through the wall of the orifice, but is not necessarily a single cylindrical channel and may, for example, be a plurality of fine cylindrical channels. Alternatively, it may be a fine tube fitted in a radially extending fine groove formed in one side surface of the orifice. Still alternatively, the tap may be fine channel extending radially obliquely through the wall of the orifice, with one end opening into the throat of the orifice and the other end opening in the surface, on the downstream side, of the orifice, as shown in FIG. 1c, or may be formed by a fine tube attached to the surface, on the downstream side, of the orifice as shown in FIG. 1d.

It should also be understood that, although in the embodiment of FIG. 1 the front and back surfaces of the orifice plate are flat and parallel to each other, the orifice used in the orifice flow meter of the invention is not restricted thereto.

The peripheral edge of the throat of the orifice should be of such a shape that the flow of fluid will not be broken away from the wall of the throat at the tap or will be detached to a negligible extent. In this view, the peripheral edge on the upstream side of the throat is slightly rounded. This rounding of the upstream edge has been found to constitute an important factor since it provides that the coefficient of flow of the orifice is substantially unaffected by the shape and the radius of the edge. Thus, provided that the ratio of the radius of the rounded edge at the upstream side of the throat to the thickness of the orifice plate is maintained within the range of 0.10 to 0.40, tests have shown that the variation of the coefficient of flow of the orifice is maintained within plus or minus 2 percent, (assuming other factors to be maintained constant) with flows having Reynolds' numbers between 2,900 to 33,000. In the preferred embodiment, the above-mentioned ratio is maintained within the range of about 0.25 to 0.30.

The most remarkable advantage of the invention is that it is unnecessary to take into consideration the vena contracta phenomenon which is difficult to make constant.

For the flow meter of the instant invention, the coefficient of vena contracta is not necessary but a coefficient to compensate a pressure loss occurring from the tap at the location where the cross-sectional area of the conduit is relatively large to the tap at the location where the same is relatively small (which has been called coefficient of velocity) is necessary. The coefficient of discharge is necessary also for the orifice flow meter of the invention but is far closer to 1 than heretofore, since the coefficient of vena contracta is unnecessary. This is also one of the meritorious features of the orifice flow meter of the invention.

Figure 2:
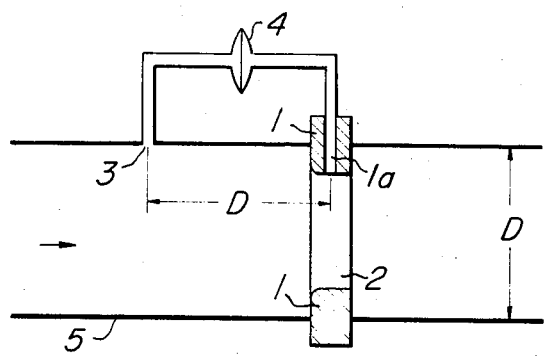
FIG. 2 is a diagrammatic illustration showing one form of the orifice flow meter according to the invention.

In the orifice flow meter of the invention also, the tap at the larger cross-sectional area portion of the conduit is provided at a location similar to that of the conventional orifice flow meters. For instance, the tap is provided at a location spaced substantially by the diameter of the conduit 5 upstream from the orifice as shown in FIG. 2 which is a horizontal cross-sectional view of the orifice flow meter of the invention. In FIG. 2 reference numeral 1 designates the orifice, 1a the tap provided in said orifice, 2 the throat of the orifice, 3 the tap provided at the location where the cross-sectional area of the conduit is relatively large, and 4 a differential pressure gauge.

What I claim is:

1. An orifice flow meter comprising an orifice plate provided in a conduit through which flows the fluid to be measured, the orifice plate having an inner cylindrical wall defining the orifice and being rounded at the upstream end thereof, the ratio of the radius of curvature of the rounded upstream end of the orifice plate to the thickness of the plate being in the range of 0.10 to 0.40, a pressure differential gauge, at least one fluid pressure measuring channel opening in the cylindrical inner wall of the orifice and extending outwardly and communicating with one side of the pressure differential gauge, and a pressure measuring tube having one end thereof opening into said conduit at a location upstream of said orifice plate and the other end communicating with the other side of the pressure differential gauge.

2. The orifice flow meter of claim 1 wherein the ratio of the radius of the rounded upstream orifice to the thickness of the orifice plate is in the range of 0.25 to 0.30.

* * * * *